UNITED STATES PATENT OFFICE.

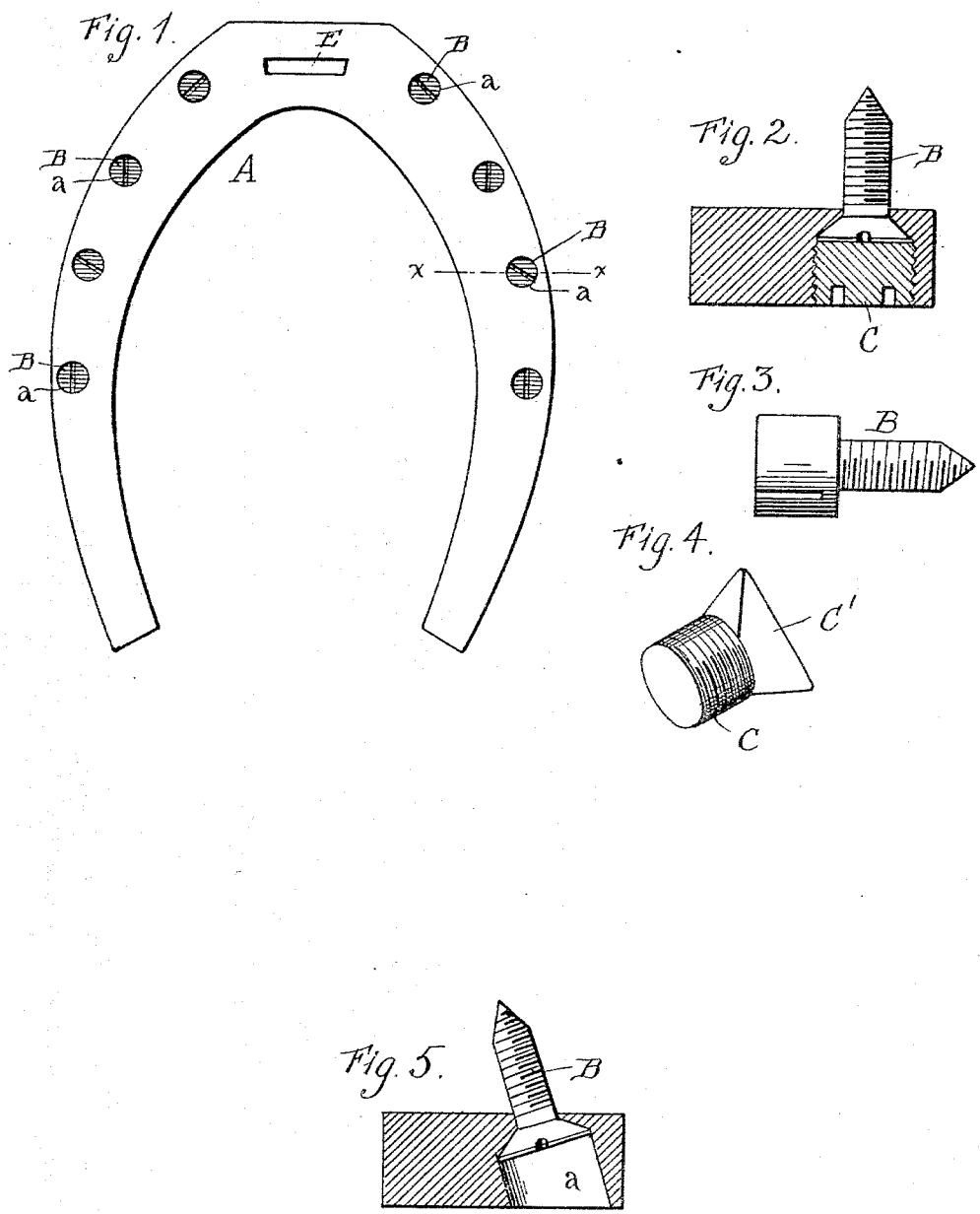

CHARLES HASSENMILLER, OF NEW ALBANY, INDIANA.

HORSESHOE.

SPECIFICATION forming part of Letters Patent No. 531,932, dated January 1, 1895.

Application filed June 27, 1894. Serial No. 515,849. (No model.)

*To all whom it may concern:*

Be it known that I, CHARLES HASSENMILLER, a citizen of the United States, and a resident of New Albany, in the county of Floyd and State of Indiana, have invented certain new and useful Improvements in Horseshoes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a plan view of the under side of shoe. Fig. 2 is a section through line $x\,x$, Fig. 1. Fig. 3 is a detail of modified form of screw. Fig. 4 is a detail of modified form of plug. Fig. 5 is a sectional view showing oblique holes.

This invention has relation to certain new and useful improvements in horse shoes, the object being to provide a shoe having means whereby it may be secured to the hoof without the use of the clinch nails commonly employed.

The common practice of securing horse shoes to the hoof by means of clinch nails is objectionable for the reason that considerable skill is required on the part of the operator to drive the nails in such a manner that they will not penetrate the tender parts of the foot and will come out at the proper points for clinching. Even with skilled operators the nails often split, one branch or prong coming out properly and the other going into the quick of the hoof ruining or laming the horse. The operation is further objectionable in that the nails disfigure the hoof, and upon being withdrawn leave unsightly breaks or holes. The wrenching and twisting necessary to remove the shoe also often injures the horse. These objections I propose to obviate by the shoe hereinafter described.

With this object in view the invention consists in the novel construction and combination of parts, all as hereinafter described, and pointed out in the appended claims.

Referring to the accompanying drawings, the letter A designates my improved shoe which can be made of any material from which it is possible or practicable to make the ordinary shoe. Formed in said shoe from the under face thereof, is a series of countersunk perforations $a$, four of such perforations upon each side being usually sufficient, although more or less may be employed. The countersinks for these perforations extend nearly through the shoe, their depth being as great as will permit the necessary bearing for the securing screws B, thus avoiding the necessity for long screws, and also burying the heads of the screws sufficiently deep to prevent their becoming worn. The shoe is first properly fitted to the hoof, and the points where the screws are to enter suitably marked, and the necessary perforations for the screws made in the hoof. The shoe is then applied and the screws seated by means of any suitable screw driver, oil being first placed on the screws if desired. The countersinks may be subsequently filled with tallow, putty, or some substance which will keep out the dirt, and prevent the screw rusting. I prefer however to provide these countersinks with a thread to enable them to receive threaded plugs C, said plugs having holes in their lower ends to permit the application of a suitable wrench.

If preferred the securing screws may be made with heads as long as the depth of the countersink, the groove in the head being correspondingly deep, so that as the shoe wears, the wear of the screw will not destroy the groove. Such a screw is shown in Fig. 3.

The plugs C may also be formed with calk extensions C′, as in Fig. 4, for use in slippery weather.

It will be apparent that this shoe can be readily applied or removed without the aid of a skilled operator, and that there is no danger of injuring the foot or disfiguring the hoof.

A hole E may be made in the toe of the shoe to enable the operator to hold it to the hoof with his chisel or other implement when heated.

The holes forming the screw seats may when the horse has a shallow hoof, be made slightly oblique to carry the screws sufficiently into the hoof to give them the proper bearing. This is illustrated in Fig. 5.

Having described my invention, what I claim as new, and desire to secure by Letters Patent, is—

1. A horse-shoe having a series of perforations formed therein and countersunk nearly through the shoe, said perforations being designed to seat screws, threads on the walls of said countersinks, and removable threaded plugs arranged to seat in said countersinks below the screw heads, substantially as specified.

2. A horse shoe having a series of perforations formed therein and countersunk deeply into the shoe, said perforations being designed to seat attaching screws, threads on the walls of said countersinks, and removable threaded plugs designed to seat in said countersinks below the screw heads, said plugs having calk extensions, substantially as specified.

In testimony whereof I affix my signature in presence of two witnesses.

CHARLES HASSENMILLER.

Witnesses:
JAMES G. HARRISON,
WALTER G. HARRISON.